*INVENTOR.*
PAUL D. BOLTON

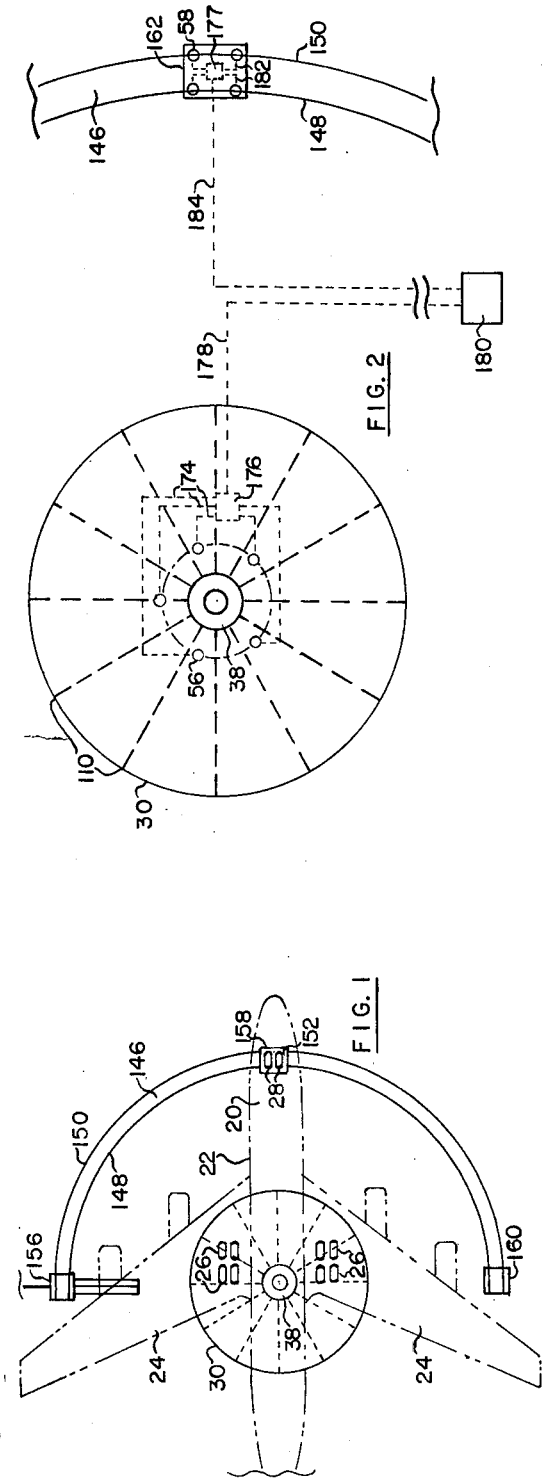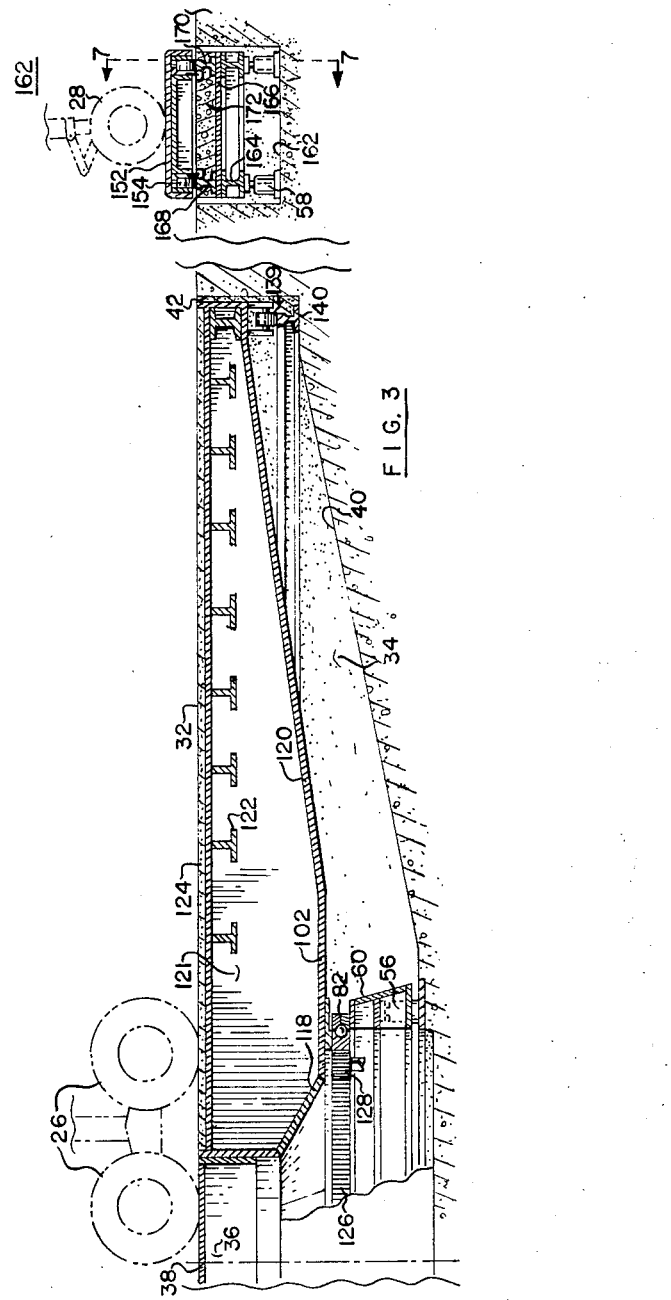
May 22, 1962 — P. D. BOLTON — 3,035,528
POSITIONING, LOCATING AND WEIGHING APPARATUS FOR AIRCRAFT OR THE LIKE
Filed May 16, 1960 — 3 Sheets-Sheet 1
*INVENTOR.*
PAUL D. BOLTON

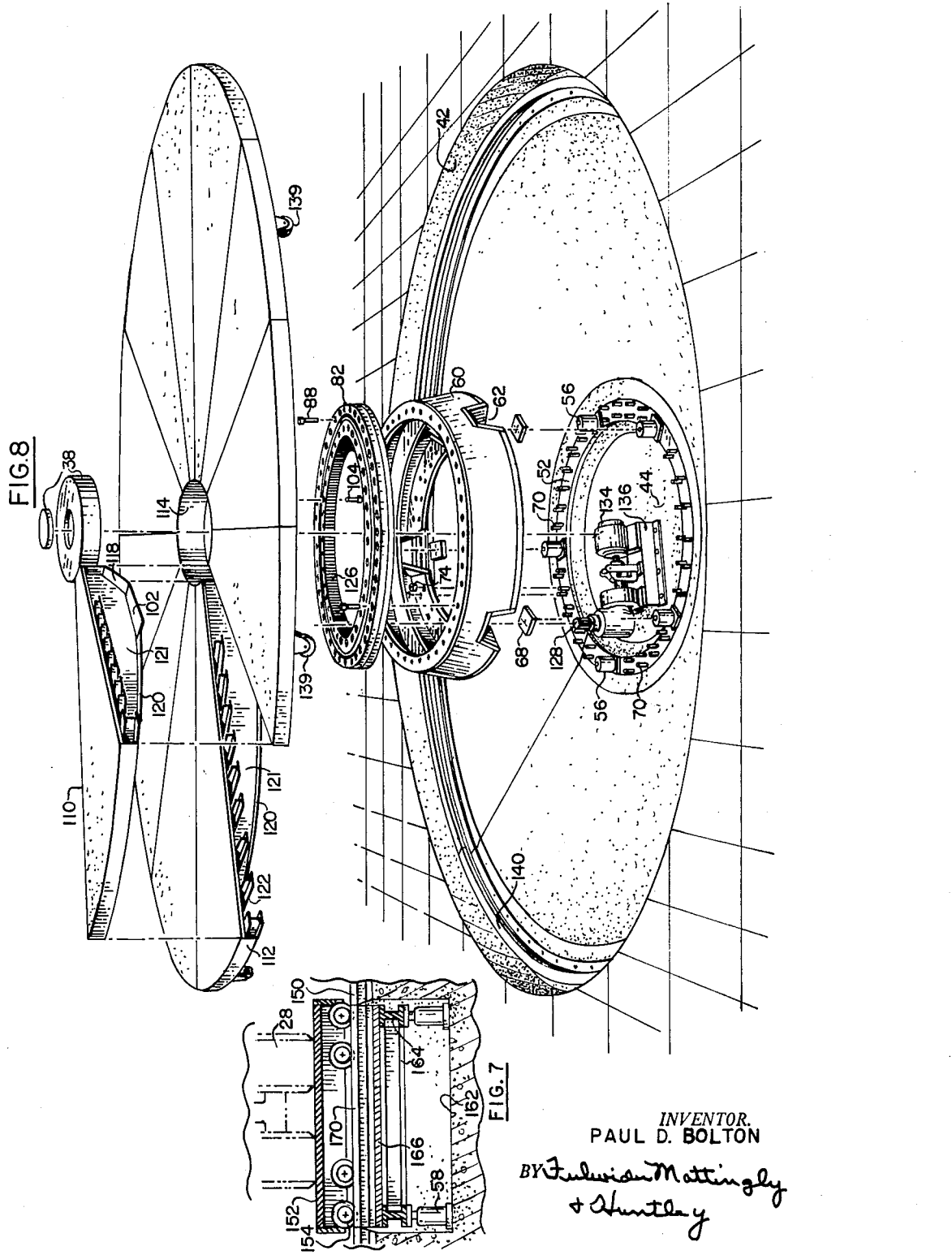

United States Patent Office 3,035,528
Patented May 22, 1962

3,035,528
POSITIONING, LOCATING AND WEIGHING APPARATUS FOR AIRCRAFT OR THE LIKE
Paul D. Bolton, 9610 Shadydale Lane, Dallas, Tex.
Filed May 16, 1960, Ser. No. 29,432
11 Claims. (Cl. 104—44)

The present invention relates to mechanism for positioning and locating large objects such as aircraft and for weighing such objects while such aircraft is on the surface of the earth. The present application is a continuation-in-part of my co-pending application Serial No. 692,910, filed October 28, 1957, for Aircraft Positioning and Locating System.

One of the broad aspects of the present invention is to provide a turntable which receives part of, for example, the main landing gear of aircraft, and in addition to this turntable, the mechanism includes a vehicle which is movable concentrically of the turntable and receives another part of the object, such as the nose gear mechanism at the front of the aircraft.

More specifically, the invention contemplates mechanism for bodily turning an object such as an airplane about a vertical axis, the mechanism comprising a turntable for supporting part of the weight of the object, and including a track arranged concentrically about the turntable. This track receives and guides a vehicle.

More specifically, the invention contemplates a large thrust bearing including concentric rings disposed on a vertical axis; these rings have confronting grooves and ball bearings are disposed in the grooves. One of these rings is carried by a ground support, preferably within a pit, and a turntable platform rests upon the other ring. Preferably this platform is at ground level. The ring that carries the platform is in the form of a ring gear which is rotated by a pinion and this pinion is rotated through gear reduction by a suitable motor.

The bearing ring, which is not rotated, is carried by a plurality of electric load weighing devices such as that shown in the patents to Ruge, 2,350,972, issued June 6, 1944, or No. 2,472,047, issued May 31, 1949, or No. 2,488,349, issued November 15, 1949, for determining the weight of the object carried on the turntable, the weight being transferred from the ring gear, that carries the platform of the turntable, to the other ring.

A track arranged concentrically and outwardly of the thrust bearing forms a second support for the platform of the turntable, the turntable being provided with rollers which ride upon the track.

In another aspect of the present invention, any suitable type of turntable may be employed having a platform of sufficient size to receive the landing gear of the large aircraft. The mechanism in addition to the turntable is provided with a support, in addition to the platform, for receiving, for example, the nose landing gear of the aircraft. In this embodiment all of the weight of the aircraft is carried by the platform of the turntable and by the second support. Electric load weighing devices, such as those heretofore mentioned, carry the platform of the turntable and the second mentioned support whereby the entire weight of the aircraft can be determined.

In the preferred embodiment this second support is in the form of a vehicle which is movable concentrically of the turntable. And in this preferred embodiment a track is provided for the support.

At the time that the aircraft is being weighed by being positioned on the platform of the turntable and by the aforementioned second support, the aforementioned rollers on the platform are rendered ineffective whereby all the weight of the aircraft is carried by the electric load weighing devices.

Further advantages will be apparent from the following description, reference being had to the accompanying drawings wherein a preferred embodiment of the invention is illustrated.

In the drawings:

FIG. 1 is a top plan view of the turntable and the outer concentric track for turning an object, the object being shown as an airplane;

FIG. 2 is a diagrammatic view of the turntable and outer concentric track, and of the electric load weighing devices and the circuit therefor;

FIG. 3 is a fragmentary view in vertical cross-section of approximately half of the turntable and the outer concentric track showing the landing gears of an airplane in the position they assume for weighing the airplane;

FIG. 7 is a fragmentary view in section looking in the direction of arrows 7—7 of FIG. 3; and FIG. 8 is a perspective view of the turntable showing the parts in exploded position.

Figure 4:
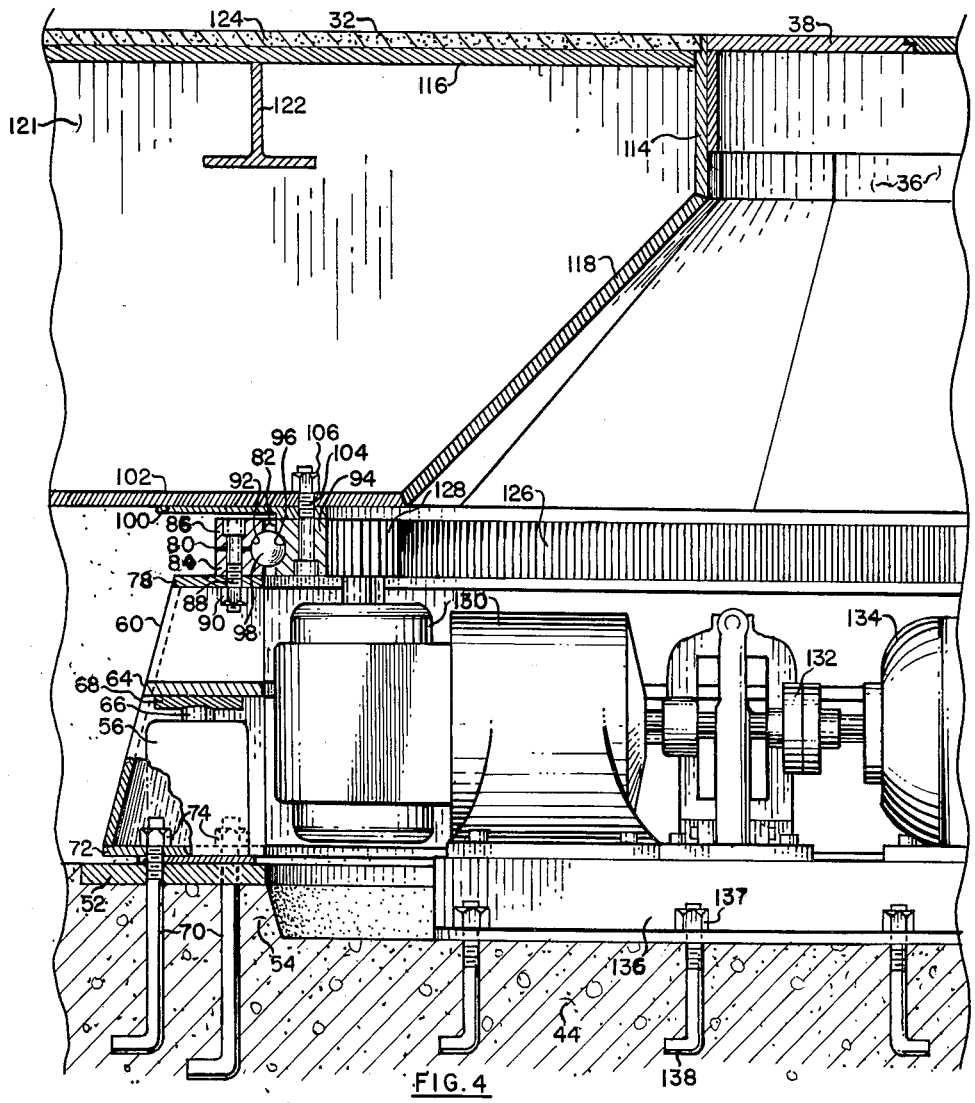
FIG. 4 is a fragmentary view in section near the central portion of the turntable but on a larger scale than that shown in FIG. 3.

Referring more in detail to the drawings the airplane, shown in phantom at 20, includes the usual fuselage 22, the wings 24, the wheels 26 of the main landing gear, and the wheels 28 of the nose gear.

The turntable is generally shown at 30. This turntable except for the top of platform 32 is disposed within a pit 34, the pit being of substantially the same diameter as the platform 32. The platform 32 is provided with a manhole 36, providing access to the pit, and this manhole is normally closed by the cover 38. The bottom of the pit is indicated by the line 40 and the sides by the circular wall 42.

Preferably the pit is provided with a concrete floor 44. A steel ring 52, arranged concentrically of the platform, is buried within a raised portion 54 of the concrete floor 44.

A series of electric load weighing devices, such as those described in the aforementioned patents, are carried by the ring 52. These devices are shown at 56, and preferably five of these devices are arranged in equally spaced relationship upon the ring 52. A circular frame 60 is carried by the five weighing devices 56. This frame is more clearly shown in FIG. 8. It is frustro conically shaped and is provided with five equally spaced open bottom recesses 62 which are aligned vertically with the five weighing devices 56. The top walls of these recesses are indicated at 64. These recesses are of sufficient width to receive these weighing devices or cells 56. A compressible button of the cells 56 is shown at 66 and steel blocks 68 are interposed between the top of buttons 66 and the bottom of the walls 64. Therefore the entire frame 60 rests upon the five compressible buttons 66 of the load cells 56.

The load cells 56 are preloaded so as to compress the cell material to their most sensitive range. To accomplish this, a plurality of bolts 70 are buried within the concrete floor 44. These bolts extend through the floor 72 of the frame 60 and the floor is pulled downwardly through the nuts 74, there being slidable relationship between the floor 72 and the shank of the bolts. By pulling downwardly on these nuts 74, the walls 64 compress the cell material of the load cells 56 through the buttons 66.

The top wall 78 of the frame 60 is in the form of a flat ring and it carries the outer ring 80 of a thrust bearing 82. This ring 80 is formed of two ring sections, namely the lower ring section 84 and the upper ring section 86, and these ring sections are clamped together by bolts 88 and nuts 90. An endless groove 92 is formed on the inner wall of the composite ring 80. The thrust bearing 82 also includes an inner ring 94 which is provided with an endless groove 96 at the circumference thereof and which complements and confronts the groove 92 at the composite ring 80. The outer diameter of the ring 94 is somewhat less than the inner diameter of the ring 80 and the complementary grooves receive a series of ball bearings 98.

Thus it will be seen that the inner ring or inner race 94 of the thrust bearing 82 is rotatable with respect to the composite ring or outer race 80. A ring 100 is directly supported by the inner ring 94 of the thrust bearing 82 and this ring 100 supports the bottom wall 102 of a plurality of base sectors of the platform 32. The bottom wall 102 and the ring 100 are fastened to the inner ring 94 by a plurality of bolts 104 and nuts 106. Since the platform of the turntable is formed of a plurality of sectors, and since these sectors are directly supported by the inner ring 94, through the ring 100, the entire weight of the platform and any object or objects thereon, is transmitted to the load cells 56, through the outer ring or race 80, the frame 60, walls 64, blocks 68, and to the weight responsive material in the cells 56 by buttons 66.

The sectors forming the platform are generally shown at 110 and are more clearly shown in FIGS. 4 and 8. Preferably ten of these sectors are provided. These sectors include the bottom wall 102, the outer arcuately shaped walls 112 and the inner arcuately shaped walls 114; these walls 112 and 114 are jointed by a top wall 116. The inner end of the bottom wall 102 is joined with the lower end of the inner arcuate wall 114 by an angularly extending wall 118 and the outer end of bottom wall 102 is joined with the lower end of the outer arcuate wall 112 by wall 120. The floor 102 and the walls 112, 114, 116, 118 and 120 are formed of heavy gauge sheet metal steel and are preferably welded at their junctions. Reinforcing, vertically extending webs 121 are welded to the bottom wall 102 and top wall 116, and inverted T-shaped angle irons 122 are suitably welded to the under side of wall 116 and webs 121, and, as shown in FIG. 8, these angle irons extend outwardly from one side of the sector. The floor or top wall 116 of the next adjacent sector rests upon the extended ends of the T-shaped angle irons. These ten sectors form a solid circular platform. The top walls 116 carry a paving material such as concrete 124. The upright arcuate shaped walls 114 of the segments provide a perfect circle at the center of the platform and thus form the manhole 36.

The inner race 94 of the thrust bearing 82 is in the form of a ring gear having teeth 126 on the inner side thereof. This ring gear is driven by a pinion 128 through reduced gearing shown in housing 130. The gearing within housing 130 is connected by coupling mechanism 132 to an electric motor 134. The electric motor, the coupling 132 and the housing 130 are carried by a platform 136. Thus it will be seen that the platform 32 can be slowly turned by the motor 134.

Figures 5, 6:
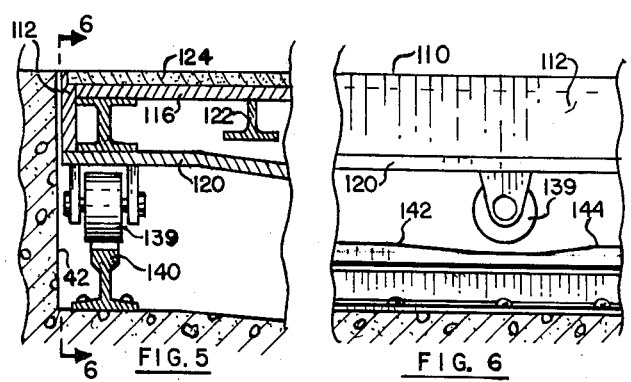
FIG. 5 is a fragmentary view in section of the left side of the turntable.
FIG. 6 is a fragmentary view looking in the direction of arrows 6—6 of FIG. 5.

Each of the sectors 110 of the platform 32 carries a roller 139 therebelow. These rollers ride upon a track 140 adjacent the peripheral edge of the pit 34. Thus normally the platform and the objects thereabove are not only carried by the ring gear but also by the track 140. This track is formed of eight sections, each comprising a little less than one-eighth of a circle there being a gap between the ends of these sections. The ends of these sections are more clearly shown at 142 and 144 in FIG. 6 whereby when the rollers are intermediate the ends of these sections, as is shown in FIG. 6, the weight of the entire platform and the object thereon is impressed upon the inner ring 94 and through this ring to the load cells 56.

The platform is moved to this position in which the rollers do not rest upon the track during the weighing operation.

A second track 146 in the form of a pair of rails 148 and 150 are disposed concentrically and outwardly of the turntable 30. The track 146 carries a dolly 152 having rollers 154 which ride upon the rails 148 and 150. This track 146 may be in the form of a complete circle but is herein shown as comprising only a half circle. The tops of the rails 148 and 150 are at ground level so as to form no obstruction for machinery passing thereover. The dolly 152 receives the nose landing gear 28 of the aircraft 20. By providing the track 146, the diameter of the turntable 30 can be materially reduced; it need only have a diameter larger than the maximum distance between the main landing gear of the aircraft. In the present embodiment the track 146 is provided with three stations 156, 158 and 160. Each of these stations is provided with a pit and track sections aligned with the track sections 146 and 150, and each is provided with an elevator for raising these track sections. When not in use the track sections in the pit, containing the dolly, are lowered so that the top of the dolly is flush with the ground level. The airplane, upon landing, will have its nose landing gear moved on to the dolly, while the dolly is at ground level; then the dolly is raised by the elevator so that the bottom of the rollers 154 are at ground level whereby the dolly can be moved onto the track sections 148 and 150. Then as the turntable is turned the dolly will move with the turntable. The stations and pits and elevators are clearly shown and described in the aforementioned co-pending application.

Referring now to the extreme right end of FIG. 3 and FIG. 7, another pit 162 is provided arcuately aligned with stations 156, 158 and 160, and in fact may be any of these three stations. This pit is formed with a concrete base and is provided with four electric load weighing devices 58. These load weighing devices are substantially equally spaced with respect to one another and carry a base 164 formed of H-shaped angle irons. The top of this base 164 carries a platform 166 which in turn carries rails 168 and 170 aligned, respectively, with rails 148 and 150. The tops of these rails are at ground level and the space therebetween carries paving material 172, the top of which is also at ground level.

In weighing the aircraft, the turntable is moved so that the dolly 152 rides upon the rail sections 168 and 170 in station 162 whereby the weight of the nose gear is impressed upon the cells 58. At this time the rollers 139 on the bottom of the turntable 30 are disposed between rail sections 142 and 144 in the pit 34 and therefore the entire weight of the airplane is carried by the turntable 30 and the platform 166, and consequently all the weight of the airplane is carried by the cells 58 in pit 162 and the cells 56 in pit 34.

The accumulative effect of the weight upon the cells 56 in the pit 34 is connected by conductors 174 to an instrument 176 which adds the effect of all five cells and thence by a conductor 178 to a computer 180. Likewise the weight effect on cells 58 in pit 162 is connected by conductors 182 to an adding instrument 176 and thence by an adding instrument 177 and conductor 184 to the computer 180. In this manner the weight accumulated at the turntable 30 of the platform 166, which is the entire weight of the weighing machinery and the aircraft carried thereby, can be indicated by the computer 180. The computer is so set that the weight of the weighing machinery is subtracted from the gross weight, whereby the exact reading of the weight of the aircraft can be attained.

It will be understood that the main platform, if desired, can be of such diameter that all aircraft, regardless of size, may be turned about their vertical axes, i.e., the turntable can be of such size that when the nose gear, of any size aircraft, rests on the dolly, the main landing gear rests entirely on the main platform of the turntable.

Too, since the relative proportion of weights carried by each cell 56 can be determined individually, by reading such individual weights and computing the same with the total weight, the center of gravity of the aircraft can be ascertained. For the purpose, it is desirable that one of the five cells, which support the main platform, is aligned with the center of the main platform and the center of the dolly, so that the distribution of lateral weight can be fairly ascertained. Also the five cells of the main turntable function cumulatively, and, the four cells carrying the dolly function cumulatively.

By computing the weight carried and indicated by the five cells of the main turntable relative to the weight carried and indicated by the four cells below the dolly, the longitudinal center of weight can be determined, and then, by computing the weight carried and indicated by the two of the five cells carrying the left side of the turntable with the weight carried and indicated by the two of the five cells carrying the right side of the turntable, the lateral center of weight can be determined. From these two determinations, the center of gravity of the aircraft can be ascertained.

While the form of embodiment herein shown and described constitutes a preferred form, it is to be understood that other forms may be adopted falling within the scope of the claims that follow.

I claim:

1. Mechanism employed for bodily turning an object, such as an airplane, about a vertical axis, and for weighing the object comprising in combination, means forming a support; a plurality of electric load weighing devices carried by the support; a thrust bearing including concentric rings disposed on a vertical axis, said rings having confronting grooves and ball bearings in the grooves, one of said rings being supported by said electric load weighing devices; and a platform for the object resting on the other of said rings.

2. Mechanism as defined in claim 1, in which the means forming a support is a pit, the thrust bearing being disposed in the pit and the platform is at ground level.

3. Mechanism as defined in claim 1, in which one of the rings of the thrust bearing is a ring gear; a pinion for driving the ring gear; and a motor for driving the pinion.

4. Mechanism as defined in claim 1, in which the inner ring of the thrust bearing is a ring gear; a pinion for driving the ring gear; and a motor for driving the pinion.

5. Mechanism employed for bodily turning an object, such as an airplane, about a vertical axis, and for weighing the object, comprising in combination, a turntable including a platform for supporting part of the weight of the object; a support for supporting the remaining part of the weight of the object; and means responsive to the weights on the platform and support for indicating the total weight of the object.

6. Mechanism as defined in claim 5, in which the support is a vehicle movable concentrically of the turntable.

7. Mechanism as defined in claim 5, in which the support is a vehicle; a track concentric of the turntable for the vehicle, said track having a vertically movable section, and the means, which is responsive to the weight on the support, carries the movable section of the track.

8. Mechanism employed for bodily turning an object, such as an airplane, about a vertical axis, and for weighing the object comprising in combination, means forming a support; a plurality of electric load weighing devices carried by the support; a thrust bearing including concentric rings disposed on a vertical axis, said rings having confronting grooves and ball bearings in the grooves, one of said rings being supported by said electric load weighing devices; a platform for supporting part of the object on the other of the rings, track sections disposed concentrically and outwardly of the thrust bearing, the ends of said sections being spaced from one another; a second platform for supporting the remaining part of the object, said second platform being aligned with the center of the thrust bearing and the space between the ends of said track sections; an electric load weighing device, said second platform being carried by the last mentioned electric load weighing device.

9. Mechanism as defined in claim 8, characterized to include a vehicle movable concentrically of the thrust bearing, said vehicle carrying the second mentioned platform.

10. Mechanism as defined in claim 8, characterized to include a second track concentric with the thrust bearing; a vehicle on the second mentioned track, said vehicle carrying the second mentioned platform.

11. Mechanism for bodily turning an object, such as an airplane, about a vertical axis, and for determining the center of gravity of said object, comprising in combination, a turntable including a platform for supporting part of the weight of the object; a plurality of means, spaced from one another and associated with the platform for indicating, respectively, the weight being borne by the platform at the locations of said spaced means; a vehicle movable concentrically of the turntable and supporting the remaining part of the object; a plurality of means, spaced from one another and associated with the vehicle for indicating respectively, the weight being borne by the vehicle at the locations of the last mentioned spaced means.

References Cited in the file of this patent

UNITED STATES PATENTS

| | | |
|---|---|---|
| 1,394,489 | Funkhouser et al. | Oct. 19, 1921 |
| 1,772,858 | Coffey | Aug. 12, 1930 |
| 2,313,084 | Manly | Mar. 9, 1943 |
| 2,488,349 | Thurston | Nov. 15, 1949 |